United States Patent Office 3,234,240
Patented Feb. 8, 1966

3,234,240
DIEPOXIDES FROM THE ACETALS OF A 1,1-BIS (HYDROXYMETHYL) CYCLOHEXENE-3 AND CINNAMIC ALDEHYDE
Daniel Porret, Basel, Switzerland, assignor to Ciba Limited, Basel, Switzerland, a Swiss company
No Drawing. Filed June 6, 1961, Ser. No. 115,072
Claims priority, application Switzerland, June 8, 1960, 6,537/60
2 Claims. (Cl. 260—340.7)

The present invention provides new epoxides of the formula

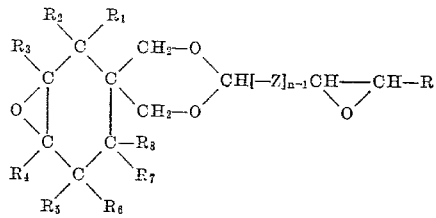

where $R_1$ to $R_8$ each represents a monovalent substituent such as a halogen or hydrogen atom or an alkoxy group or an aliphatic, cycloalipahtic, araliphatic or aromatic hydrocarbon residue, preferably an alkyl group with 1 to 4 carbon atoms, and $R_1$ and $R_5$ together may also represent an alkylene such as a methylene group, R represents an aliphatic, cycloaliphatic, araliphatic or aromatic residue, Z a divalent aliphatic radical and $n=1$ or 2.

The diepoxides of the invention are obtained by reaction of an epoxidising agent upon an unsaturated acetal of the general formula

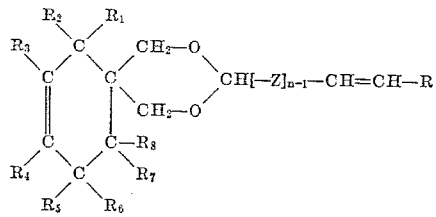

in which $R_1$ to $R_7$, R, Z and $n$ have the same meanings as in Formula I.

The starting material of the Formula II can be prepared by reaction of a dialcohol of the formula

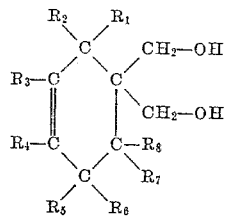

with an aldehyde of the formula

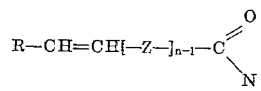

As aldehydes of the Formula IV there may be mentioned: cinnamic aldehyde, sorbic aldehyde, citronellal, citral, 2-ethylhexene-2-al-1, hexene-2-al-1, 2 methyl-pentene-2-al-1, nonadienal-2 and more especially crotonaldehyde.

Suitable dialcohols of the Formula III are, for example, 1:1-bis[-hydroxymethyl-]-cyclohexene-(3), 1:1-bis[-hydroxymethyl-] - 6 - methylcyclohexene-(3), 1:1 - bis[-hydroxy-methyl-]-2:4:6-trimethyl-cyclohexene-(3), 1:1 - bis [-hydroxymethyl-]2:5-endomethylene - cyclohexene - (3) and 1:1-bis[-hydroxymethyl-]-4-chloro-cyclohexene-(3).

The acetalisation may be carried out by known methods, for example by heating the aldehyde (IV) together with the dialcohol (III) in the presence of an acid catalyst, for example sulfuric acid, phosphoric acid, or para-toluenesulfonic acid. According to the present process the acetal of the Formula II is treated with an epoxidising agent. A suitable epoxidising agent is an organic peracid, such as peracetic, perbenzoic, peradipic, monoperphthalic acid or the like.

It could not have been expected that the process referred to above would give an excellent yield of epoxide compounds, because in the case of the homologous, unsaturated acetals from acrolein and dialcohols of the Formula III substantially only the carbon-to-carbon double bond of the cyclohexene ring is epoxidised under identical reaction conditions, that is to say that practically only monoepoxides are obtained.

Owing to side reactions the epoxidation may give rise—in addition to the epoxides—also to hydrolysed epoxides, that is to say compounds in which the epoxide groups of the epoxide of the Formula I have undergone total or partial hydrolysis to form hydroxyl groups.

It has been observed that in general the presence of such by-products has a favourable influence upon the technical properties of the cured epoxides: as a rule, it is therefore or advantage to dispense with isolation of the pure epoxides from the reaction mixture.

Particularly readily accessible are, for example, the diepoxides of the formula:

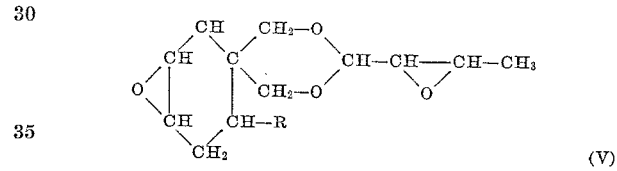

where R represents a hydrogen atom or a lower alkyl radical.

In general the epoxides of the present invention are pale liquids at room temperature and can be converted with suitable curing agents such, for example, as dicarboxylic acid anhydrides into clear and pale cured products having excellent technical properties.

The epoxidised acetals of the invention react with the usual curing agents for epoxy compounds. They can therefore be cross-linked or cured with the aid of such curing agents similar to other polyfunctional epoxy compounds or epoxy resins. As such curing agents basic or more especially acidic compounds are suitable.

The following have been found suitable: Amines or amides, such as aliphatic and aromatic primary, secondary and tertiary amines, for example mono-, di- and tributylamines, para-phenylenediamine, bis[-para-aminophenyl-]-methane, ethylenediamine, N:N-diethylenediamine, diethylenetriamine, tetra[-hydroxyethyl-]-diethylenetriamine, triethylenetetramine, tetraethylenepentamine, N:N-dimethylpropylenediamine, trimethylamine, diethylamine, triethanolamine, Mannich's bases, piperidine, piperazine, guanidine and guanidine derivatives such as phenyldiguanidine, diphenylguanidine, dicyanidiamide; aniline-formaldehyde resins, urea-formaldehyde resins, melamine-formaldehyde resins; polymers of aminostyrenes; polyamides, for example those from aliphatic polyamines and dimerised or trimerised unsaturated fatty acids; isocyanates, isothiocyanates; polyhydric phenols, for example resorcinol, hydroquinone, bis[-4-hydroxyphenyl-]dimethylmethane, quinone, phenolaldehyde resins, oilmodified phenol-aldehyde resins; reaction products of aluminium alcoholates or phenolates with compounds of tautomeric reaction of the type of acetoacetic ester; Friedel-Crafts catalysts, for example aluminium chloride, antimony pentachloride, tin tetrachloride, zinc chloride, boron trifluoride and their complexes with organic compounds; metal fluoborates, or phosphoric acid. Preferred curing agents are polybasic carboxylic acids and anhydrides thereof, for example phthalic anhydride, methyl-endomethylene-tetrahydrophthalic anhydride, dodecenyl-succinic anhydride, hexahydrophthalic anhydride, hexachloro-endomethylene-tetrahydrophthalic anhydride or endomethylene-tetrahydrophthalic anhydride or mixture thereof; maleic or succinic anhydride. If desired there may further be used accelerators, such as tertiary amines or strong Lewis bases, for example alkali metal alcoholates, and with advantage also polyhydroxy compounds such as hexanetriol or glycerol.

It has been observed that it is of advantage to carry out the curing of an epoxy resin of the invention with a carboxylic acid anhydride with the use of only about 0.3 to 0.9 gram equivalent of anhydride groups for every gram equivalent of epoxide groups. When a basic accelerator, such as an alkali metal alcoholate or an alkali metal salt of a carboxylic acid, is used, up to 1.0 gram equivalent of anhydride groups may be employed.

The term "curing" as used in this connection refers to the conversion of the aforementioned epoxide compounds into insoluble and infusible resins.

Accordingly the present invention includes also curable mixtures containing the new epoxidised acetals and curing agents for epoxy resins, preferably anhydrides of dicarboxylic or polycarboxylic acids.

The curable mixtures of the invention further contain with advantage a proportion of suitable acetals whose epoxide groups are wholly or partially hydrolysed to hydroxyl groups, and/or other polyhydroxy compounds having a cross-linking action such as hexanetriol. It is of course also possible to add to the curable epoxy compounds other epoxides, such, for example as monoglycidyl or polyglycidyl ethers of monoalcohols or polyalcohols such as butonaol, 1:4-butanediol or glycerol, or of monophenols or polyphenols such as resorcinol bis[-4-hydroxyphenyl-]dimethylmethane or condensation products of aldehydes with phenols (Novolaks), also polygylcidyl esters of polycarboxylic acids such as phthalic acid, furthermore aminopolyepoxides such as are obtained, for example, by dehydrohalogenating reaction products of epihalohydrins with primary or secondary amines, such as n-butylamine, aniline or 4:4'-di-(monomethylamino)-diphenylmethane.

Furthermore, the curable epoxy compounds or mixtures thereof with curing agents can be mixed with fillers, plasticisers, colouring matters and the like at any stage prior to the curing operation. Suitable extenders and fillers are, for example, asphalt, bitumen, glass fibres, mica, quartz meal, cellulose, kaolin, finely dispersed silicic acid (Aerosil) or metal powders.

The mixture of the new epoxy compounds with curing agents can be used without or with fillers, if desired in the form of solution or emulsions, as textile assistants, laminating resins, paints, lacquers, dipping resins, casting resins, casting compositions, pore fillers, putties, adhesives, moulding compositions and the like and also for the manufacture of such products. The new resins are particularly valuable as insulating compounds in the electrical industry.

In the following examples parts and percentages are by weight and the relationship of part by weight to part by volume is the same as that of the kilogram to the litre.

EXAMPLE 1

(A) *Acetal from crotonaldehyde and 1:1-bis[-hydroxymethyl-] cyclohexene-3*

A mixture of 426 parts of 1:1-bis[-hydroxymethyl-] cyclohexene-3 and 221 parts of crotonaldehyde is heated to 45° C. and 3 parts by volume of sulfuric acid of 98% strength are stirred in. The temperature rises spontaneously by 10° and water is eliminated. 800 parts by volume of benzene are then added and the mixture is dehydrated azeotropically under atmospheric pressure. After 80 minutes 60 parts of water have separated. The acid is neutralised with 3 parts of sodium carbonate and the benzene is distilled off under a partial vacuum and then the acetal-3-propenyl-2:4-dioxospiro(5:5) undecene-9 is distilled off under a high vacuum. 470 parts of acetal pass over at 77° C. under a pressure of 0.15 mm. Hg. 105 parts of an undistillable residue remain behind.

(B) *Epoxidation*

291 parts of the acetal prepared as described in Example 1(A) are taken up with 800 parts of benzene. 30 parts of sodium acetate are added and the whole is heated to 35° C. Within 30 minutes 580 parts of peracetic acid of 43.2% strength are added dropwise. The temperature is maintained for 7 hours at 35° C., at the end of which time the oxidant has been consumed (90% of theory). The mixture is then cooled and the aqueous layer separated. The benzene layer is washed with 3 x 150 parts by volume of water. In the third washing the mixture is neutralized with 48 parts of sodium hydroxide of 30% strength. The benzene is distilled off under a partial vacuum and the remainder is concentrated in a high vacuum, to yield 240 parts of a colorless liquid containing 7.08 epoxide equivalents per kg. (=80% of theory) which consists predominantly of the compound of the formula

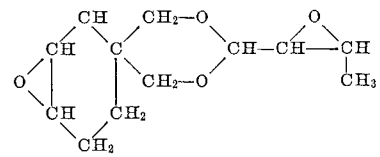

When this product is cured for 24 hours at 160° C. with phthalic anhydride (0.6 equivalent of anhydride groups per epoxide equivalent) an infusible, pale resin is obtained which has good mechanical properties.

EXAMPLE 2

(A) *Acetal from crotonaldehyde and 1:1-bis [-hydroxymethyl-]-6-methylcyclohexene-3*

A mixture of 558 parts of 1:1-bis[-hydroxymethyl-]-methylcyclohexene and 397 parts of crotonaldehyde is heated to 45° C. and 1 part of sulfuric acid of 50% strength is added. Within 2 minutes the temperature rises to 67° C. and a small amount of water separates. 1300 parts by volume of benzene are then added and the mixture is dehydrated azeotropically under atmospheric pressure. Within 80 minutes 105 parts of water are separated and the remainder is then neutralized with 1 part of sodium carbonate. The benzene is then distilled under a partial vacuum and the acetal 3-propenyl-7-methyl-2:4-dioxospiro (5:)undecene-9 is distilled at 82° C. under 0.1 mm. Hg pressure, to yield 1032 parts of acetal. The yield amounts to 90.6% calculated on 1:1-bis-(hydroxymethyl)-6-methyl-cyclohexene-3.

(B) *Epoxidation*

A solution of 416 parts of the acetal prepared as described in Example 2 (A) in 1120 parts of benzene is treated with 40 parts of sodium acetate and the mixture is heated to 35° C. In the course of 30 minutes 768 parts of peracetic acid of 43.5% strength are then vigorously stirred in dropwise and the mixture is maintained for 5 hours at 35° C., at first by cooling and then by heating. The mixture is then cooled and the aqueous layer is separated. The benzene layer is neutralized and concentrated as described in Example 1, to yield 371 parts of a water-clear liquid containing 6.45 epoxide equivalents per kg, consisting predominantly of the compound of the formula

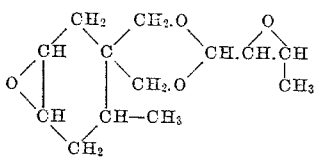

This product can be cured with acid anhydrides or with amines to form infusible resins having good mechanical properties.

EXAMPLE 3

(A) *Acetal from cinnamic aldehyde and 1,1-bis [-hydroxymethyl-]cyclohexene-3*

A mixture of 213 parts of 1,1-bis[hydroxymethyl-] cyclohexene-3 and 206 parts of cinnamic aldehyde is heated to 55° C. 1 part by volume of sulfuric acid of 50% strength is added. Within three minutes the temperature rises to 62° C. and some water separates. 600 parts by volume of benzene are then added, and the mixture dehydrated by azeotropic distillation under atmospheric pressure. Within 90 minutes 27 parts of water are separated. After that 1 part of anhydrous sodium carbonate is added, and the benzene distilled off under reduced pressure. 374 parts of the acetal are then distilled at 130–140° C. under a pressure of 0.1 mm. of Hg. The colorless product solidifies on cooling and then melts at 69° C. The yield is 97% of the theoretical, calculated on 1,1-bis-[-hydroxymethyl-] cyclohexene-3.

(B) *Epoxidation*

374 parts of the acetal prepared as described in Example 3(A) are dissolved in 1000 parts of benzene. 30 parts of anhydrous sodium acetate are added and the mixture heated to 35° C. In the course of 25 minutes 565 parts of peracetic acid of 43.2% strength are then vigorously stirred in dropwise and the mixture maintained at 35° C. for 5 hours. The aqueous layer is then separated. The benzene layer is washed, neutralized and concentrated as described in Example 1, to yield 360 parts of a highly viscous yellow product containing 4.72 epoxide equivalents per kg. and consisting predominantly of the compound of the formula

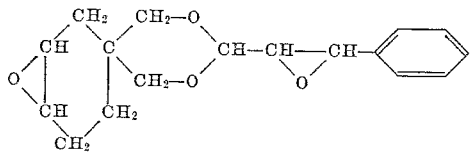

EXAMPLE 4

In 100 parts of the diepoxide prepared as described in Example 1(B) phthalic anhydride as curing agent is dissolved at 120–125° C., there being used for each equivalent of epoxide groups 0.55 equivalent of anhydride groups in a first batch, and 0.65 equivalent in a second batch. The mixtures are cast into aluminium molds (40 x 10 x 140 mm.) and cured for 24 hours at 140° C. and for 24 hours at 180° C. The resulting moldings have the following heat distortion temperatures according to Martens:

| Batch | Equivalents of anhydride groups per equivalent of epoxide groups | Heat distortion temperature according to Martens (DIN) ° C. |
|---|---|---|
| 1 | 0.55 | 148 |
| 2 | 0.65 | 148 |

EXAMPLE 5

In 100 parts of the diepoxide prepared according to Example 3(B) 43 parts of phthalic anhydride as curing agent are dissolved at 120–125° C. The mixture is cast into aluminium molds and cured for 24 hours at 140° C. and for 24 hours at 180° C. The heat distortion temperature according to Martens (DIN) of the molding is 128° C.

EXAMPLE 6

62 parts of phthalic anhydride (0.65 equivalent of anhydride groups per equivalent of epoxide groups) are dissolved at 120° C. in 100 parts of the diepoxide prepared according to Example 2(B). The mixture is cast into molds and cured for 24 hours at 120° C., 24 hours at 140° C. and 24 hours at 180° C. The resulting molding has a heat distortion temperature according to Martens (DIN) of 143° C.

For comparison, 124 parts of phthalic anhydride are dissolved at 120°–130° C. in 100 parts of vinylcyclohexene-dioxide having 12.85 epoxide equivalents per kg. (commercial product of Union Carbide). The mixture is cast into aluminum molds and cured at different temperatures. The heat distortion temperatures of the moldings are as follows:

| Curing conditions: | Heat distortion temperature according to Martens (DIN), ° C. |
|---|---|
| 24 hours 120° C.+24 hours 140° C. | 46 |
| 24 hours 120° C.+24 hours 180° C. | (1) |
| 24 hours 140° C.+24 hours 180° C. | Same |
| 24 hours 120° C. | Same |

[1] Too brittle, molding cracked.

What is claimed is:
1. The diepoxide of the formula

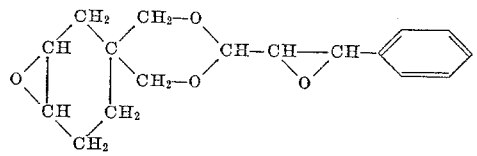

2. The diepoxide of the formula

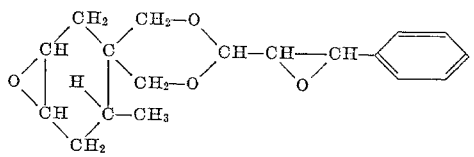

References Cited by the Examiner
UNITED STATES PATENTS
2,895,962   7/1959   Fischer _____ 260—340.7

OTHER REFERENCES

Swern: "Chem. Reviews," volume 45, pages 16 to 24 (1949.)

NICHOLAS S. RIZZO, *Primary Examiner.*

IRVING MARCUS, DUVAL T. McCUTCHEN, WALTER A. MODANCE, *Examiners.*